US005723528A

United States Patent [19]

Mason

[11] Patent Number: 5,723,528
[45] Date of Patent: Mar. 3, 1998

[54] IMPACT MODIFIED THERMOPLASTIC POLYESTER MOLDING COMPOSITION

[75] Inventor: James P. Mason, McKees Rocks, Pa.

[73] Assignee: Bayer Corporation, Pittsburgh, Pa.

[21] Appl. No.: 498,939

[22] Filed: Jul. 6, 1995

[51] Int. Cl.$^6$ ...................................................... C08K 3/36
[52] U.S. Cl. ........................... 524/492; 524/493; 524/588; 524/601; 525/101
[58] Field of Search ..................................... 525/105, 102, 525/101; 524/493, 492, 588, 601

[56] References Cited

U.S. PATENT DOCUMENTS 2,901,466  8/1959  Kibler et al. .
5,153,238  10/1992  Bilgrien et al. .......................... 523/211

FOREIGN PATENT DOCUMENTS 2083014  5/1993  Canada .

OTHER PUBLICATIONS

R. Buch et al, "Silicone–Bsed Additives for Thermoplastic Resins Providing improved Impact Strength, Process and Fire Retardant Synergy", (Dow Corning Corp). Fire Retardant Chem. Assoc., Oct. 26–29, 1993.

*Primary Examiner*—Mark L. Warzel
*Attorney, Agent, or Firm*—Joseph C. Gil; Aron Preis

[57] ABSTRACT

The impact strength of a thermoplastic molding composition containing polyalkylene terephthalate resin is improved upon the incorporation therewith of a particular silicone rubber powder. The silicone rubber powder, added at a level of about 8 to 25 percent, contains a mixture of (a) a polydiorganosiloxane and (b) finely divided silica filler.

11 Claims, No Drawings

IMPACT MODIFIED THERMOPLASTIC POLYESTER MOLDING COMPOSITION

The invention concerns thermoplastic molding composition and more particularly a composition containing polyester resins.

The invention is based on the surprising and unexpected finding that the impact performance of a thermoplastic composition containing polyalkylene terephthalate resin is improved upon incorporation therewith of a particular silicone rubber powder. The silicone rubber powder, added at a level of about 8 to 25 percent, relative to the weight of the composition, is characterized in that it contains a mixture of (a) a polydiorganosiloxane and (b) silica.

Thermoplastic polyester resin is well known and is readily available in commerce. While its chemical resistance is well recognized and is the basis for the wide applicability of the resin, its low impact resistance and brittle failure limits the utility of the resin. Attempts to improve this property continue. The literature includes a large number of patents directed to this subject. Also known are blends of thermoplastic and any of a variety of impact modifiers.

Of particular relevance in the present context is a paper by R. Buch et al "Silicone-Based Additives for Thermoplastic Resins Providing improved Impact Strength, Processing and Fire Retardant Synergy". This prior art paper (Dow Corning Corporation) disclosed certain Silicone Powder Resin Modifiers products termed RM 4-7081 and RM 4-7051 to be useful in reducing the rate of heat release and the evolution rates of smoke and carbon monoxide of burning plastics, including polycarbonate. Also disclosed is the impact strength improvement for engineering resins such as polyphenylene ether (PPE) and PPS.

Also related is Canadian patent application 2,083,014 which disclosed the silicone rubber powder of the present invention as a component in a composition containing poly(phenylene ether) resin.

It has now been discovered that certain silicone rubber powders, preferably produced in accordance with the procedure disclosed in U.S. Pat. No. 5,153,238 which is incorporated herein by reference, are useful as impact modifier in thermoplastic molding compositions containing polyalkylene terephthalate. The inventive compositions therefore contain about 8 to 25 percent, preferably 10 to 20 percent relative to the weight of the composition, of the silicone rubber powder.

The thermoplastic (co)polyester suitable in the present invention comprise repeat units from at least one $C_{6-20}$-aromatic, $C_{3-20}$-aliphatic or alicyclic dicarboxylic acid ,and repeat units from at least one $C_{2-20}$-aliphatic glycol.

Examples of the dicarboxylic acids include malonic, succinic, glutaric, adipic, pimelic, suberic, azelaic, sebacic, dodecanedioic, 1,4-, 1,5- and 2,6-decahydronaphthalene dicarboxylic acid, and cis- or trans-1,4-cyclohexane dicarboxylic acid. Examples of useful aromatic dicarboxylic acid are terephthalic acid; isophthalic acid; 4, acid; trans 3,3'- and trans 4,4'-stilbenedicarboxylic acid, 4,4'-dibenyldicarboxylic acid; 1,4-, 1,5'-, 2,3'-, 2,6, and 2,7-naphthalenedicarboxylic acid. The preferred dicarboxylic acids are terephthalic and isophthalic acid or mixtures thereof.

The preferred glycol of the (co)polyester includes 2 to 8 carbon atoms. Examples include ethylene glycol, 1,2-propylene glycol, 1,3-propanediol, 1,4-butanediol, 1,5-pentanediol, 1,6-hexanediol, 1,2-, 1,3- and 1,4-cyclohexanedimethanol, neopentyl glycol, and 2,2,4,4-tetramethyl-1,3-cyclobutanediol. The preferred diols are 1,4-cyclohexanedimethanol, ethylene glycol and mixtures thereof.

The preferred (co)polyesters include resins having repeat units from poly(ethylene terephthalate) or poly(1,4-cyclohexylenedimethylene terephthalate). Preferred (co)polyesters comprise repeat units from terephthalic acid, isophthalic acid or mixtures thereof and 1,4-cyclohexanedimethanol. Other preferred (co)polyesters comprise repeat units from terephthalic acid and 1,4-cyclohexanedimethanol, ethylene glycol or mixtures thereof.

The preparation of the (co)polyesters follow conventional procedures well known in the art such as the process described in U.S. Pat. No. 2,901,466 which disclosure is incorporated herein by reference. The (co)polyesters of the invention have as a rule inherent viscosity of about 0.4 to 1.0 dl/g, preferably about 0.6 to 0.8 dl/g at 25 C. in a solvent containing 60 w/% phenol and 40 w/% tetrachloroethane.

Included among the suitable polyesters are the reaction product of a glycol portion which contains 1,4ocyclohexanedimethanol (CHDM) and ethylene glycol (EG) wherein the molar ratio of CHDM to EG is from about 1:4 to 4:1, with an acid portion comprising at least one of phthalic acid and isophthalic acid. These may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example to 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as NaH Ti(OC4H9)6 in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

Among the preferred polyesters of this type suitable for use in the subject invention is a copolyester as described above wherein the glycol portion has a predominance of ethylene glycol over 1,4-cyclohexanedimethanol, for example greater than 50/50 and especially preferably is about 70 molar ethylene glycol to 30 molar 1,4-cyclohexanedimethanol and the acid portion is terephthalic acid.

A commercially available copolyester of this preferred type is EKTAR 6763 PETG sold by the Eastman Kodak Company.

The silicone rubber powder of the invention has an average particle size of about 1 to 1000 microns and contains (i) 100 parts by weight (pbw) of a polydiorganosiloxane and (ii) about 10 to 80 pbw, preferably about 20 to 50 pbw of a finely divided silica filler.

The polydiorganosiloxane which is characterized in that its viscosity at 25° C. is about $10^6$ to $10^9$ centipoise is a (co)polymeric resin having siloxane structural units represented by the general formula

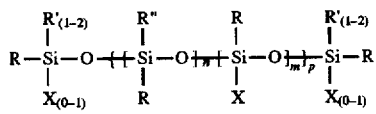

wherein R, R' and R" independently denote hydrogen, $C_{1-10}$-alkyl, alkenyl, cycloalkyl radicals or aryl groups, and where p is about 1000 to 8000, preferably about 3000–6000 and where the relative weight proportions of n and m are 98.5–100:0–1.5, preferably 99:1, and where X denotes a member selected from the group consisting of

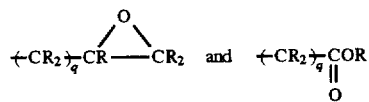

where R denotes hydrogen, $C_{1-10}$-alkyl, alkenyl, cycloalkyl radicals or aryl groups and where q is 1–10.

The organic groups of the polydiorganosiloxane, which may optionally be halogenated, are preferably lower alkyl radicals containing 1–4 carbon atoms, phenyl and halogen substituted alkyl radicals. Examples include resins containing dimethylsiloxy units, phenylmethylsiloxy units and dimethylsiloxy units and diphenyl siloxy units. Most preferably, the polydiorganosiloxane contains vinyl group(s) or epoxy group(s) at its chain termination(s) and/or along its main chain. The methods for the preparation of suitable polydiorganosiloxane are well known; a typical method comprise the acid- or base-catalyzed polymerization of cyclic diorganosiloxanes.

The silica filler required in the silicone rubber powder is a finely divided silica selected from among fumed silica and precipitated silica or silica gel. These are well known forms of silica and are readily available in commerce. The suitable silica is characterized in that its surface area is at least 50 $m^2/g$, preferably 50 to 900 $m^2/g$.

An additional embodiment entails use of treated silica which contains sites bonded to groups X as defined above; the manufacture of treated silica, typically by reacting the silanol groups on the silica surface with about 1–2% by weight of an organic alkyl halide compound or an organosilicon halide compound, is known in the art.

Among the suitable compounds mention may be made of low molecular weight liquid hydroxy- or alkoxy-terminated polydiorganosiloxanes, hexaorganosiloxanes and hexaorganosilazanes.

The procedure for the preparation of the silicone rubber powder has been described in detail in U.S. Pat. No. 5,153,238 the specification of which is incorporated herein by reference. Suitable silicone rubber powder is available in commerce from Dow Corning Corporation under the trademark RM 4-7051 and RM 4-7081.

The preparation of the composition of the invention is carried out following conventional procedures and by use of conventional means such as single, preferably twin screw extruders. Conventional thermoplastic processes are suitable in molding useful articles from the inventive composition.

Compositions in accordance with the invention have been prepared following well-known procedures and their properties determined as described below: In the examples the thermoplastic polyester resin was polyethylene terephthalate having a inherent viscosity of about 0.9 dl/g Ektar 12822 a product of Eastman ); the silicone rubber powder was Dow Corning's RM 4-7051. The advantageous impact strength (notched Izod, 1/8") is apparent.

| Example | 1 | 2 | 3 | 4 | 5 |
|---|---|---|---|---|---|
| PET, wt % | 100 | 97 | 90 | 85 | 80 |
| silicone rubber powder, wt. % | 0 | 3 | 10 | 15 | 20 |
| Impact strength, notched Izod, 1/8" ft.lb/in. | 0.5 | 0.7 | 1.4 | 9.1 | 10.2 |

Conventional additives may be incorporated in the composition of the invention in the usual quantities. Mention may be made of a thermal stabilizer, a mold release agent, a pigment, a flame retarding agent, a uv stabilizer, a hydrolysis stabilizer, a gamma radiation stabilizer and a plasticizer for polycarbonate compositions, as well as fillers and reinforcing agents such as glass fibers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (a) a thermoplastic polyester resin, and (b) a silicone rubber powder, wherein said powder is present in the composition in an amount of about 8 to 25 percent relative to the weight of the composition, said silicone rubber powder having an average particle size of about 1 to 1000 microns and containing (i) 100 pbw of a polydiorganosiloxane having a viscosity at 25° C. is about $10^6$ to $10^9$ centipoise and siloxane structural units represented by the general formula

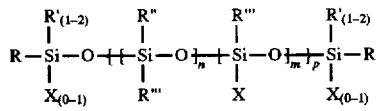

wherein R', R" and R'" independently denotes a member selected from the group consisting of hydrogen atom, $C_{1-10}$-alkyl, alkenyl, cycloalkyl radicals and aryl groups, and where p is about 1000 to 8000 and where the relative weight proportions of n and m is 98.5 to 100: 0 to 1.5, and where X denotes a member selected from the group consisting of

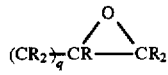

and

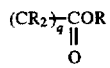

where R denotes a member selected from the group consisting of hydrogen, $C_{1-10}$-alkyl, alkenyl, cycloalkyl radicals and aryl groups and where q is 1–10, and (ii) about 10 to 80 pbw of a finely divided silica selected from the group consisting of fumed silica, precipitated silica and silica gel having a surface area of at least 50 m²/g, said composition characterized in that it has a notched Izod impact strength value which is greater than that of the thermoplastic polyester resin alone.

2. The composition of claim 1 wherein said hydrocarbon radical is selected from the group consisting of $C_{1-10}$ alkyl radicals; alkenyl radicals; cycloalkyl radicals; and aromatic hydrocarbon radicals.

3. The composition of claim 2 wherein said hydrocarbon radical is a lower alkyl radical containing 1–4 carbon atoms or a phenyl radical.

4. The composition of claim 1 wherein said silica has a surface area of about 50 to 900 m²/g.

5. The composition of claim 1 wherein said p is about 5000–6000.

6. The composition of claim 1 wherein the relative weight proportions of n and m is 99:1.

7. A thermoplastic molding composition comprising (a) a thermoplastic polyester resin, and (b) a silicone rubber powder, wherein said powder is present in the composition in an amount of about 10 to 20 percent relative to the weight of the composition, said silicone rubber powder having an average particle size of about 1 to 1000 microns and containing (i) 100 pbw of a polydiorganosiloxane having a viscosity at 25° C. is about $10^6$ to $10^9$ centipoise and siloxane structural units represented by the general formula

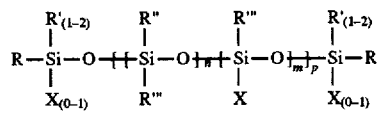

wherein R', R" and R'" independently denote a member selected from the group consisting of hydrogen atom, $C_{1-10}$-alkyl, alkenyl, cycloalkyl radicals and aryl groups, and where p is about 1000 to 8000 and where the relative weight proportions of n and m is 98.5 to 100:0 to 1.5, and where X denotes a member selected from the group consisting of

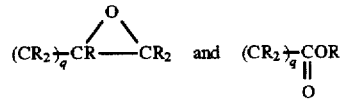

where R denotes a member selected from the group consisting of hydrogen, $C_{1-10}$-alkyl, alkenyl, cycloalkyl radicals and aryl groups and where q is 1–10, and (ii) about 20 to 50 pbw of a finely divided silica selected from the group consisting of fumed silica, precipitated silica and silica gel having a surface area of at least 50 m²/g, said composition characterized in that it has a ¼" notched Izod impact strength value which is greater than that of the thermoplastic polyester resin alone.

8. The composition of claim 7 wherein said silica has a surface area of about 50 to 900 m²/g.

9. The composition of claim 7 wherein the relative weight proportions of n and m is 99:1.

10. The composition of claim 1 wherein said silica contains sites bonded to said X.

11. The composition of claim 1 further containing at least one member selected from the group consisting of a thermal stabilizer, a mold release agent, a pigment, a flame retarding agent, a uv stabilizer, a hydrolysis stabilizer, a gamma radiation stabilizer, a plasticizer a filler and a reinforcing agent.

* * * * *